United States Patent
Igarashi et al.

(10) Patent No.: US 6,777,372 B1
(45) Date of Patent: Aug. 17, 2004

(54) METHOD FOR PRODUCING HYDROCYANIC ACID SYNTHESIS CATALYST

(75) Inventors: Takeshi Igarashi, Niigata-ken (JP); Susumu Naito, Niigata-ken (JP); Tohru Nakamura, Niigata-ken (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 43 days.

(21) Appl. No.: 09/669,426

(22) Filed: Sep. 25, 2000

(30) Foreign Application Priority Data

Sep. 27, 1999 (JP) ............................................ 11-272247

(51) Int. Cl.⁷ ............................ B01J 23/70; B01J 23/74; B01J 23/00; B01J 23/40; B01J 23/42
(52) U.S. Cl. ........................ 502/338; 502/325; 502/326
(58) Field of Search ................................. 502/325, 326, 502/338, 336; 148/276, 287, 634, 579, 590

(56) References Cited

U.S. PATENT DOCUMENTS

| | | | | | |
|---|---|---|---|---|---|
| 2,110,893 | A | * | 3/1938 | Sendzimir | 91/70.3 |
| 3,615,353 | A | * | 10/1971 | Mahoney | 75/43 |
| 3,936,543 | A | * | 2/1976 | Byrd et al. | 427/320 |
| 4,123,292 | A | * | 10/1978 | Gibson et al. | 148/6.35 |
| 4,327,132 | A | * | 4/1982 | Shinno | 427/235 |
| 4,693,877 | A | | 9/1987 | Oehsen et al. | |
| 5,226,968 | A | * | 7/1993 | Ohmi et al. | 118/720 |
| 5,268,509 | A | | 12/1993 | Immel et al. | |
| 5,295,668 | A | * | 3/1994 | Ohmi | 266/252 |
| 5,407,492 | A | * | 4/1995 | Ohmi et al. | 148/287 |
| 5,580,398 | A | * | 12/1996 | Ohmi | 148/280 |
| 5,817,424 | A | * | 10/1998 | Ohmi | 428/472.1 |
| 5,840,368 | A | * | 11/1998 | Ohmi | 427/255.4 |
| 6,210,806 | B1 | * | 4/2001 | Hidaka et al. | 428/469 |
| 6,231,690 | B1 | * | 5/2001 | Azuma | 148/287 |

FOREIGN PATENT DOCUMENTS

EP 0 648 864 B * 2/1997

\* cited by examiner

*Primary Examiner*—Cam Nguyen
(74) *Attorney, Agent, or Firm*—Leydig, Voit & Mayer, Ltd.

(57) ABSTRACT

A method for producing a hydrocyanic acid synthesis catalyst is disclosed which comprises sequential exposure of an iron surface, such as, for example, pig iron, to sequential oxidative and reductive atmospheres, preferably using repetitive cycles, the oxidative atmosphere preferably containing 5% to 3% by volume oxygen and the reductive atmosphere preferably containing 1% to 99% hydrogen.

10 Claims, No Drawings

METHOD FOR PRODUCING HYDROCYANIC ACID SYNTHESIS CATALYST

FIELD OF THE INVENTION

The present invention, relates to a method for producing a catalyst that is involved in the reaction for the production of hydrocyanic acid and water by thermal decomposition of formamide. It more specifically relates to a catalyst production method which may be put into practice commercially using an extremely simple process which does not make use of corrosive liquid reagents or the like during the preparation of a catalyst and which does not require further treatment after preparation.

BACKGROUND OF THE INVENTION

Methods for the synthesis of hydrocyanic acid by the selective thermal decomposition of formamide using a catalyst made from a metal or a metal oxide have long been known. With regard to the catalyst used, many are known in the prior art, and, for example, cyanide is synthesized from formamide using a pipe catalyst prepared by impregnating aluminum into the surface of a reaction pipe using a melted aluminum bath to create an iron-aluminum alloy as is reported in Japanese Patent 1960-9182. Additionally Japanese Patent 1958-6229 discloses a method for preparing catalyst by treating a saturated solution of potassium bichromate in concentrated sulfuric acid, a solution of potassium permanganate in concentrated sulfuric acid, aqueous hydrogen peroxide and the like. To carry out these methods on an industrial scale, it is necessary to prepare several specialized items of equipment for conducting various treatments.

The method according to Japanese Patent 1960-9182 for preparing an oxidized layer where a steel pipe is used in the reactor requires a very large investment for the application of industrial equipment made of multiple pipe reactors by methods for preparing reaction pipes. In addition where an oxidative reagent is used in the same manner as in Japanese Patent 1958-6229, it is necessary to add a separate piece of equipment to prepare the reagents, and reagent left in the reaction equipment for unspecified periods of time can cause corrosion trouble. Moreover, during and after treatment with the reagent, it is necessary to conduct and administer complicated and difficult procedures to recycle the reagent during and after treatment.

Moreover because the catalyst layer prepared by the use of reagents exhibits poor adhesion, and because it cannot endure long continuous use, this method exhibits the defect of almost all of the catalyst separating and falling away. Without even taking into account the loss of catalyst activity caused by the peeling off of the oxide layer, this results in the additional bad effect of contamination of the system by the metal oxides that have peeled off. The inventors of the present invention achieved the present invention as a result of intensive and purposeful research to discover a method for solving these problems.

SUMMARY OF THE INVENTION

The object of the present invention is to offer a method for producing catalyst for the synthesis of hydrocyanic acid by thermal decomposition of formamide which exhibits both high activity and stability over a long period of time.

DETAILED DESCRIPTION OF THE INVENTION

The inventors of the present invention conducted various investigations to arrive at the discovery of a method of treatment by a gas as a method for preparing an oxide layer without carrying out a reagent treatment on the surface of the pipe. The results were that it was relatively easy to prepare an oxide layer without carrying out a reagent treatment on the surface of the pipe. However, preparation of a layer with catalyst performance and strong adhesion were not easily accomplished. The results of further investigations were that by treatment of the metal surface by means of a method that satisfied certain specific conditions, it was observed that it was possible to create an oxide layer possessing high catalyst performance and strong adhesion. More specifically, by sequential treatment involving controlled oxidative and reductive gas, an invention in which the preparation of an oxide layer that possesses catalyst performance and moreover good adhesive strength were observed was obtained. That is to say, the present invention relates to a method for the preparation of a catalyst for the synthesis of hydrocyanic acid characterized by sequential exposure of an iron surface to an oxidative gas and a reductive gas.

As for the iron which is a raw material used in the method for preparing the catalyst of the present invention, illustrative preferred examples include pig iron containing about 2% by weight or more of carbon, steel containing carbon less than about 2% by weight and additionally, steels characterized by the addition to these carbon steels of alloying elements other than carbon may be used. However, as may be appreciated, any source of iron may be used that can be utilized to carry out the desired synthesis. Many such sources are known.

The form or shape of the iron used in the method for producing a catalyst of the present invention varies according to the way in which the catalyst is used. In the case where the catalyst is packed in a column, a particulate or powdered form is preferred and the surface of these particulate or powdered irons are made into an oxide layer. When the catalyst is used as a reaction pipe, from the stand point of longevity, the use of steel is preferred as the iron source and the internal surface of the steel pipe is made into an oxide layer.

When the surface of the iron of the present invention is exposed to an oxidative atmosphere and a reductive atmosphere, the conditions are preferably as follows. The oxidative atmosphere is possible to achieve by covering the iron surface with a gas containing between 5% and 30% by volume of oxygen. An easy and preferred method is to cover the surface with air. The temperature of treatment during exposure to an oxidative atmosphere is between 300° C. and 650° C., the treatment pressure is between 6 kPa and 150 kPa, the space velocity (referred to below as "SV") is from 10 to 1500 h$^{-1}$ and a time for one cycle of this phase of treatment of between 5 and 300 minutes is preferred.

An illustrative example of a reductive atmosphere is to cover the iron surface with a gas containing 1% and 99% by volume of hydrogen. preferably between 2% and 20% by volume of hydrogen. The oxygen content contained in the gas should be as little as possible. Covering the surface with a gas composed of hydrogen and steam, or a gas composed of hydrogen and nitrogen and steam are preferred. The temperature of treatment during exposure to an oxidative atmosphere is preferably between 300° C. and 650° C., the treatment pressure is between 6 kPa and 150 kPa, an SV of from 10 to 1500 h$^{-1}$ and a time for one cycle of this phase of treatment of between 10 and 300 minutes. Repetitive cycles of respective exposure to an oxidative atmosphere and exposure to a reductive atmosphere are preferred. It is thus preferred that at least two cycles be used; and, indeed, 10 to 40 or more cycles can be desirably utilized. Where repeated cycles of respective exposure to an oxidative atmosphere and exposure to a reductive atmosphere are both repeated, it does not matter which atmosphere is introduced first.

Where hydrocyanic acid is produced by the thermal decomposition of formamide using the catalyst of the present invention, it is preferred that the gas phase decomposition reaction be carried out continuously, and the formamide which constitutes the raw material is supplied to the reactor as a gas. In this case, illustrative useful reaction conditions include a reaction temperature of from 300° C. to 600° C., a reaction pressure of from 6 to 150 kPa, an SV of from 50 to 1500 $h^{-1}$ for between 60 and 3000 minutes.

It will generally be desired to regenerate the catalyst when the activity has declined below the desired level. The activity can be determined in reference to the conversion and/or yield. Any other parameter or parameters may, of course, be utilized as is desired. Regeneration is carried out with gas containing from 5% to 30% by volume of oxygen and, preferably, in air, having a temperature of between 300° to 600° C., a pressure of from 6 to 150 kPa, an SV of from 10 to 1500 $h^{-1}$ for a period of between 10 and 500minutes. It is possible to make hydrocyanic acid from formamide by repeating the aforementioned reaction and regeneration technique.

By using the method of the present invention, it is possible to minimize the peripheral equipment needed for the preparation of a hydrocyanic acid synthesis catalyst without the disposal of used reagent or separated oxide layer, the economic effects of which are favorable and large.

The catalyst produced by the present invention, in comparison to prior catalysts, is characterized by smaller, more compact crystals, free of any contaminants, such as trapped liquid residue or the like. These characteristics, and particularly the crystal size contribute to an enhanced initial effectiveness and stability. Thus, use of the catalyst of this invention allows superior output of hydrocyanic acid, without fouling or the like, at the initial stages of operation.

The practice examples that follow are for the purpose of explaining the Present Invention by illustrating some of the practical embodiments within its scope, but are in no way intended to limit the scope of the present invention or the ways in which it may be practiced.

EXAMPLE 1

A steel pipe having an internal diameter of 10.9 mm and length of 448 mm was selected as the material for the reaction pipe. After conducting treatment under an oxidative atmosphere for 50 minutes by supplying the inside of the steel pipe with air at SV 80 $h^{-1}$ at a pressure of 13.3 k Pa and a temperature of 400° C., under the same conditions the gas was switched to a gas composed of a hydrogen, nitrogen and steam in a molar ratio of 6:17:77 at SV350 $h^{-1}$ and this reductive treatment was continued for 180 minutes. The aforementioned oxidative and reductive treatments were alternatively repeated 10 times each and a hydrocyanic acid synthesis catalyst was obtained by the creation of an oxide layer inside the pipe.

Subsequently, using the catalyst thus obtained, hydrocyanic acid was produced by thermal decomposition of formamide. Formamide gas was passed over the catalyst inner surface of the pipe at SV 350 $h^{-1}$. The reaction temperature was 400° C. and the reaction pressure was 13.3 kPa, and after conducting the reaction for 60 minute from start to obtain a formamide in a conversion ratio of 99.6 mole % and a hydrocyanic acid yield of 94.6 mole %.

EXAMPLE 2

A steel pipe having an internal diameter of 10.9 mm and length of 448 mm was selected as the material for the reaction pipe. After conducting treatment under an oxidative atmosphere for 5 minutes by supplying the inside of the steel pipe with air at SV 260 $h^{-1}$ at a pressure of 13.3 k Pa and a temperature of 400° C., under the same conditions the gas was switched to a gas composed of a hydrogen, nitrogen and steam in a molar ratio of 6:17:77 at SV 480 $h^{-1}$ and this reductive treatment was continued for 45 minutes. The aforementioned oxidative and reductive treatments were alternatively repeated 40 times each and a hydrocyanic acid synthesis catalyst was obtained by the creation of an oxide layer inside the pipe.

Subsequently, using the catalyst thus obtained, hydrocyanic acid was produced by thermal decomposition of formamide under the same conditions as in Example 1. The reaction was carried out for 60 minutes to obtain a formamide in a conversion ratio of 99.2 mole % and a hydrocyanic acid yield of 94.2 mole %.

Comparative Example 1

Except for the use of a steel pipe having an internal diameter of 10.9 mm and length of 448 mm which had not been subjected to oxidation and reduction treatment as the reaction pipe, a thermal decomposition of formamide was carried out under the same conditions as in Example 1. The reaction was continued for 60 minutes from the start of the reaction and a formamide conversion ratio of 36.5 mole % and a hydrocyanic acid yield of 34.7 mole % were obtained.

EXAMPLE 3

In order to confirm the strength of adhesion of the catalyst made according to Example 1, a continuous process for 7 days was carried out consisting of alternate formamide thermal decomposition reaction and catalyst regeneration carried out using air to counter the decline in catalyst performance due to adhesion of carbon materials on the catalyst's surface. To measure the volume of detached catalyst that came about during this procedure, the pipe was disconnected. There was no accumulated iron oxide in the mouth of the pipe. The thermal decomposition of formamide was carried out for 7 hours at a time at a reaction temperature of 400° C., a reaction pressure of 13.3 kPa while formamide gas was supplied to the inside of the reaction pipe at an SV of 700 $h^{-1}$ and the catalyst regeneration was carried out by passing air through the inside of the reaction pipe at an SV of 300 $h^{-1}$, a treatment temperature of 400° C. and a reaction pressure of 13.3 kPa for 1 hour at a time.

Comparative Example 2

Using a steel pipe the same as was used in Example 1, an oxidative layer was formed by oxidative reagents. After impregnating for 48 hours using the reagent, a saturated solution of iron formate in aqueous formic acid, and then was heated under a flow of air at 400° C. for one hour. In the reaction pipe, a 0.5 mm thick accumulation of iron oxide layer had formed. Next, using this reaction pipe, the same operation as in Example 3 which included alternate thermal decomposition of formamide and catalyst regeneration was conducted for 7 days continuously. From the mouth of the reaction pipe when it was opened for investigation was taken an accumulation of 1.3 grams composed of iron oxide. This accumulated amount was equal to the amount of the iron oxide layer on the surface of the reaction pipe before the reaction was started and as a result it was observed that almost all of the layer had fallen off.

We claim:

1. A method for producing a hydrocyanic acid synthesis catalyst comprises selecting an iron source and form for the hydrocyanic acid synthesis catalyst and having an iron surface and sequentially exposing the iron surface to oxidative and reductive atmospheres, wherein the oxidative atmosphere is a gas containing from about 5% to 30% by volume of oxygen.

2. The method of claim 1 wherein the reductive atmosphere is a gas containing between 1% and 99% by volume of hydrogen.

3. The method of claim 1 wherein said form is an iron pipe and the inner surface of said iron pipe is sequentially exposed to oxidative and reductive atmospheres.

4. The method of claim 1 wherein at least two cycles of exposure to oxidative and reductive atmospheres are carried out.

5. A method for producing a hydrocyanic acid synthesis catalyst which comprises selecting an iron source and form for the hydrocyanic acid synthesis catalyst and having an iron surface and sequentially exposing the iron surface to oxidative and reductive atmospheres, wherein the exposure of the iron surface to the oxidative atmosphere is conducted under the conditions that the temperature is in the range of about 300° C. to 650° C., the pressure is in the range of from about 6 kPa to 150 kPa, a space velocity of from about 10 to 150 $h^{-1}$ and the time is from about 5 to 300 minutes.

6. The method of claim 5 wherein the exposure of the iron surface to the oxidative and reductive atmospheres is conducted under the conditions that the temperature is in the range of about 300° C. to 650° C., the pressure is in the range of from about 6 kPa to 150 kPa, a space velocity of from about 10 to 150 $h^{-1}$ and the time is from about 5 to 300 minutes.

7. The method of claim 5 wherein said form is an iron pipe and the inner surface of said iron pipe is sequentially exposed to oxidative and reductive atmospheres.

8. A method for producing a hydrocyanic acid synthesis catalyst which comprises selecting an iron source and form for the hydrocyanic acid synthesis catalyst and having an iron surface and sequentially exposing the iron surface to oxidative and reductive atmospheres, wherein the exposure of the iron surface to the reductive atmosphere is conducted under the conditions that the temperature is in the range of about 300° C. to 650° C., the pressure is in the range of from about 6 kPa to 150 kPa, a space velocity of from about 10 to 150 $h^{-1}$ and the time is from about 5 to 300 minutes.

9. The method of claim 8 wherein said form is an iron pipe and the inner surface of said iron pipe is sequentially exposed to oxidative and reductive atmospheres.

10. A method for producing a hydrocyanic acid synthesis catalyst comprises selecting an iron source and form for the hydrocyanic acid synthesis catalyst and having an iron surface, sequentially exposing the iron surface to oxidative and reductive atmospheres and carrying out at least 10 cycles of exposure to oxidative and reductive atmospheres.

* * * * *